US007949900B2

(12) United States Patent
Harrington et al.

(10) Patent No.: US 7,949,900 B2
(45) Date of Patent: May 24, 2011

(54) AUTONOMOUSLY CONFIGURING INFORMATION SYSTEMS TO SUPPORT MISSION OBJECTIVES

(75) Inventors: Nathan J. Harrington, Cary, NC (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/234,094

(22) Filed: Sep. 19, 2008

(65) Prior Publication Data

US 2010/0077263 A1    Mar. 25, 2010

(51) Int. Cl.
*G06F 11/00* (2006.01)
(52) U.S. Cl. .......................................... 714/27; 701/29
(58) Field of Classification Search .................. 714/26, 714/27; 701/29–35
See application file for complete search history.

(56) References Cited

U.S. PATENT DOCUMENTS

| | | | | |
|---|---|---|---|---|
| 5,293,556 | A * | 3/1994 | Hill et al. ....................... 702/184 |
| 6,199,179 | B1 * | 3/2001 | Kauffman et al. ............... 714/26 |
| 6,769,022 | B1 * | 7/2004 | DeKoning et al. ............ 709/223 |
| 7,137,020 | B2 * | 11/2006 | Gilstrap et al. ............... 713/324 |
| 7,168,007 | B2 * | 1/2007 | Gilstrap et al. ................. 714/37 |
| 7,409,578 | B2 * | 8/2008 | Haselden et al. .................. 714/4 |
| 7,409,594 | B2 * | 8/2008 | Mukherjee et al. ............. 714/26 |
| 7,490,265 | B2 * | 2/2009 | Baskey et al. .................... 714/15 |
| 7,640,325 | B1 * | 12/2009 | DeKoning et al. ............. 709/223 |
| 2002/0128988 | A1 * | 9/2002 | Covington et al. ............ 705/413 |
| 2005/0172161 | A1 * | 8/2005 | Cruz et al. ......................... 714/4 |
| 2005/0210331 | A1 * | 9/2005 | Connelly et al. ................ 714/26 |
| 2006/0015299 | A1 * | 1/2006 | McDermott et al. ........... 702/188 |
| 2006/0025903 | A1 * | 2/2006 | Kumar ............................ 701/19 |
| 2006/0026288 | A1 | 2/2006 | Acharya et al. |
| 2006/0161819 | A1 * | 7/2006 | Nissan-Messing et al. ..... 714/48 |
| 2007/0101178 | A1 * | 5/2007 | Jammu et al. ...................... 714/4 |
| 2007/0149360 | A1 | 6/2007 | Narayanaswami |
| 2007/0279241 | A1 * | 12/2007 | Jung et al. ................... 340/691.6 |
| 2008/0046142 | A1 * | 2/2008 | Jordan et al. .................... 701/36 |
| 2009/0019096 | A1 * | 1/2009 | Kern et al. ..................... 707/204 |
| 2009/0100293 | A1 * | 4/2009 | LaComb et al. ................ 714/26 |

* cited by examiner

*Primary Examiner* — Bryce P Bonzo
(74) *Attorney, Agent, or Firm* — Dillon & Yudell LLP

(57) ABSTRACT

Disclosed is a method, system, and computer program product for automatically configuring information systems to support mission objectives. A Mission SoulPad is connected to an information system via a communication bus, such as a USB bus connection. The Mission SoulPad may autonomously detect and configure components of the information system (e.g., displays, sensors, emitters, transceivers) to support the defined objectives of the Mission SoulPad. The Mission SoulPad may also identify malfunctioning components of the information system needing repair or replacement. Typical operations of malfunctioning components may be dynamically re-routed to functional components. Entire sensor and information display suites may be transitioned simply by moving the Mission SoulPad between available information systems. This ensures that mission critical information is consistently available regardless of the type of system the Mission SoulPad is connected to.

18 Claims, 3 Drawing Sheets

AUTONOMOUSLY CONFIGURING INFORMATION SYSTEMS TO SUPPORT MISSION OBJECTIVES

BACKGROUND OF THE INVENTION

1. Technical Field

The present invention relates in general to information systems. Still more particularly, the present invention relates to automatically configuring information systems to support mission objectives.

2. Description of the Related Art

Existing information systems may incorporate multiple sensor and display systems requiring time consuming and often complicated configurations to support operator defined mission objectives. A typical information system may be a personnel information system mounted on a soldier's person, or an on-board information system of an armored personnel carrier (APC). For example, the on-board information system of an APC may have multiple components (e.g., displays, sensors, transceivers) all capable of supporting mission objectives. In the existing art each component requires specific programming and configuration that is performed in down time prior to the start of a mission. Changing mission objectives and real-world events may necessitate an on-the-fly re-configuration of the APC's on-board information system. However, time constraints may prohibit an operator from being able to manually re-configure a system before use.

SUMMARY OF THE INVENTION

A method, system, and computer program product for automatically configuring information systems to support mission objectives. A Mission SoulPad is connected to an information system via a communication bus, such as a USB bus connection. The Mission SoulPad may autonomously detect and configure components of the information system (e.g., displays, sensors, emitters, transceivers) to support the defined objectives of the Mission SoulPad. The Mission SoulPad may also identify malfunctioning components of the information system needing repair or replacement. Typical operations of malfunctioning components may be dynamically re-routed to functional components. Entire sensor and information display suites may be transitioned simply by moving the Mission SoulPad between available information systems. This ensures that mission critical information is consistently available regardless of the type of system the Mission SoulPad is connected to.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for autonomously configuring information systems to support mission objectives.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
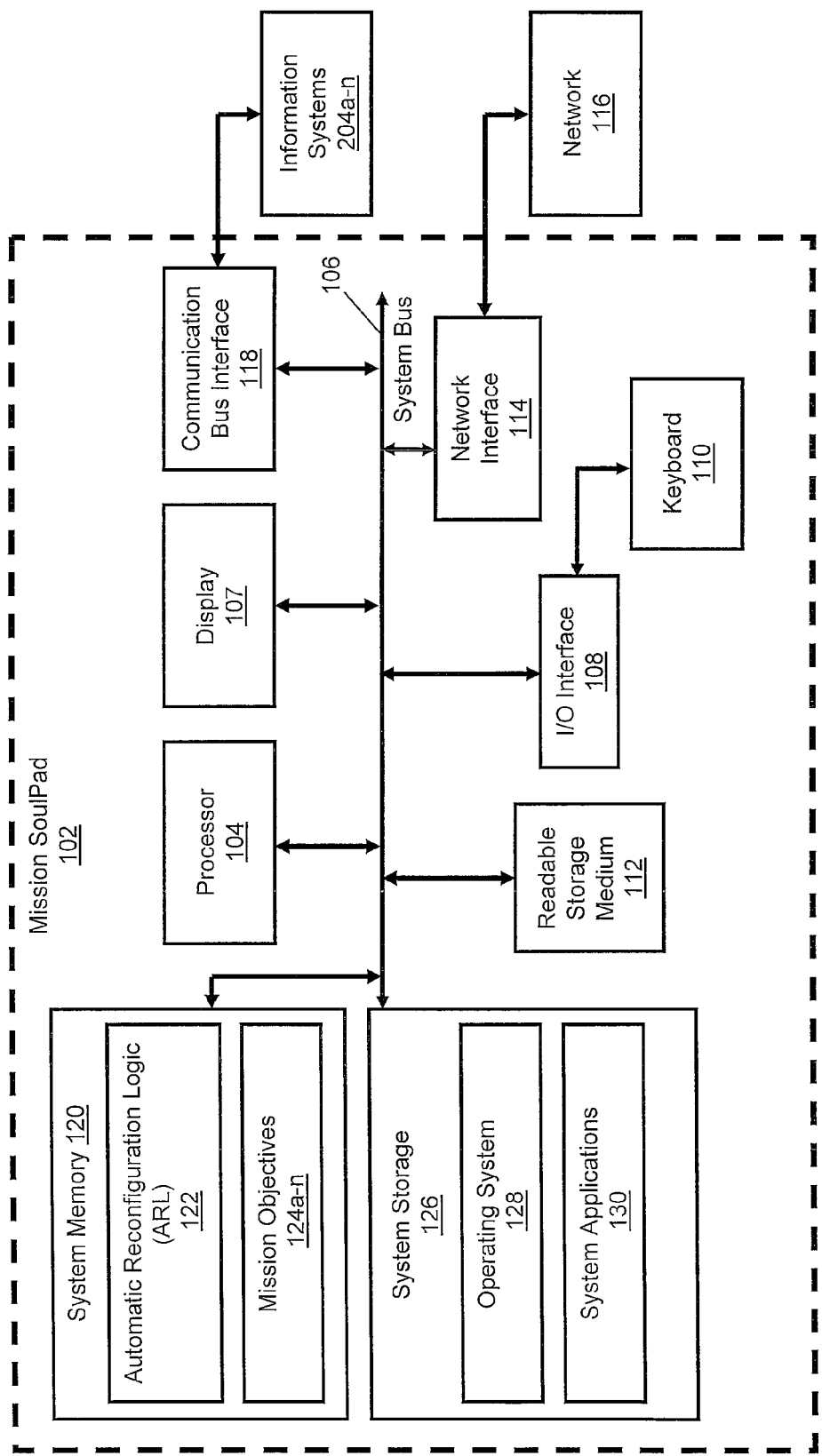
FIG. 1 is a block diagram of an exemplary embodiment in which the present invention may be implemented.

With reference now to FIG. 1, there is depicted a block diagram of a Mission SoulPad 102 in which the present invention may be implemented. Mission SoulPad 102 includes a processor 104 that is coupled to a system bus 106. Display 107, coupled to system bus 106, allows for presentation of a general user interface (including text and graphics) for use by a user of Mission SoulPad 102. Input/Output (I/O) Interface 108, also connected to system bus 106 permits user interaction with Mission SoulPad 102, such as data entry via keyboard 110. System bus 106 also enables communication with a hardware-based readable storage medium 112 (e.g., Compact Disk-Read Only Memory (CD-ROM), flash drive memory, etc). A network interface 114, connected to system bus 106, enables Mission SoulPad 102 to connect to network 116 utilizing wired or wireless technology. A communication bus interface 118, connected to system bus 106, enables Mission SoulPad 102 to connect to information systems 204*a-n*, where n is an integer greater than one, utilizing wired or wireless technology (e.g., Universal Serial Bus (USB) Interface, Ethernet, Wi-Fi, etc). Additionally, in some embodiments Mission SoulPad 102 may draw power from this communication bus to facilitate normal operation.

Mission SoulPad 102 also comprises system memory 120, which is connected to system bus 106. System memory 120 of Mission SoulPad 102 includes automatic reconfiguration logic (ARL) 122. ARL 122 includes code for implementing the processes described in FIGS. 2-3. System memory 120 also includes mission objectives 124*a-n*. Mission objectives 124 establish tasks and goals relevant to a current mission of an operator of Mission SoulPad 102. Additionally, mission objectives 124*a-n* may specify instructions for utilizing specific components (e.g., displays, sensors, emitters, transceivers, etc) of an information system 204*a-n* to display, track, or monitor some activity via that specific component. In one embodiment, Mission SoulPad 102 is able to utilize ARL 122 to autonomously configure information systems 204*a-n* to support mission objectives 124.

Mission SoulPad 102 also comprises system storage 126, which is connected to system bus 106. System storage 126 of Mission SoulPad 102 includes operating system 128 and system applications 130. Additionally, system storage may be secured using encryption technology (e.g. AES128 block cipher). Operating system 128 is an auto-configuring operating system. In one embodiment, operating system 128 may boot on an information system 204a-n when connected, therefore resuming a suspended virtual machine state (not pictured) of the operating system 128. This virtual machine state may further contain an operator's personal profile consisting of the operator's files, computing environment, desktop configuration, as well as running system applications and open windows. In one embodiment, when Mission SoulPad 102 is connected to an information system 204a-n, ARL 122 may utilize functionality of the system 128 and system applications 130 to further interface with components of a connected information system 204a-n.

As illustrated and described herein, Mission SoulPad 102 may be a computer system or server having the required hardware components and programmed with ARL 122, executing on the processor to provide the functionality of the invention. However, Mission SoulPad 102 may also be a device that is specifically designed to include the functionality of ARL 122, as described herein. The hardware elements depicted in Mission SoulPad 102 are not intended to be exhaustive, but rather are representative to highlight essential components required by and/or utilized to implement the present invention. For instance, Mission SoulPad 102 may include alternate memory storage devices such as magnetic cassettes, Digital Versatile Disks (DVDs), Bernoulli cartridges, and the like. These and other variations are intended to be within the spirit and scope of the present invention.

Figure 2:
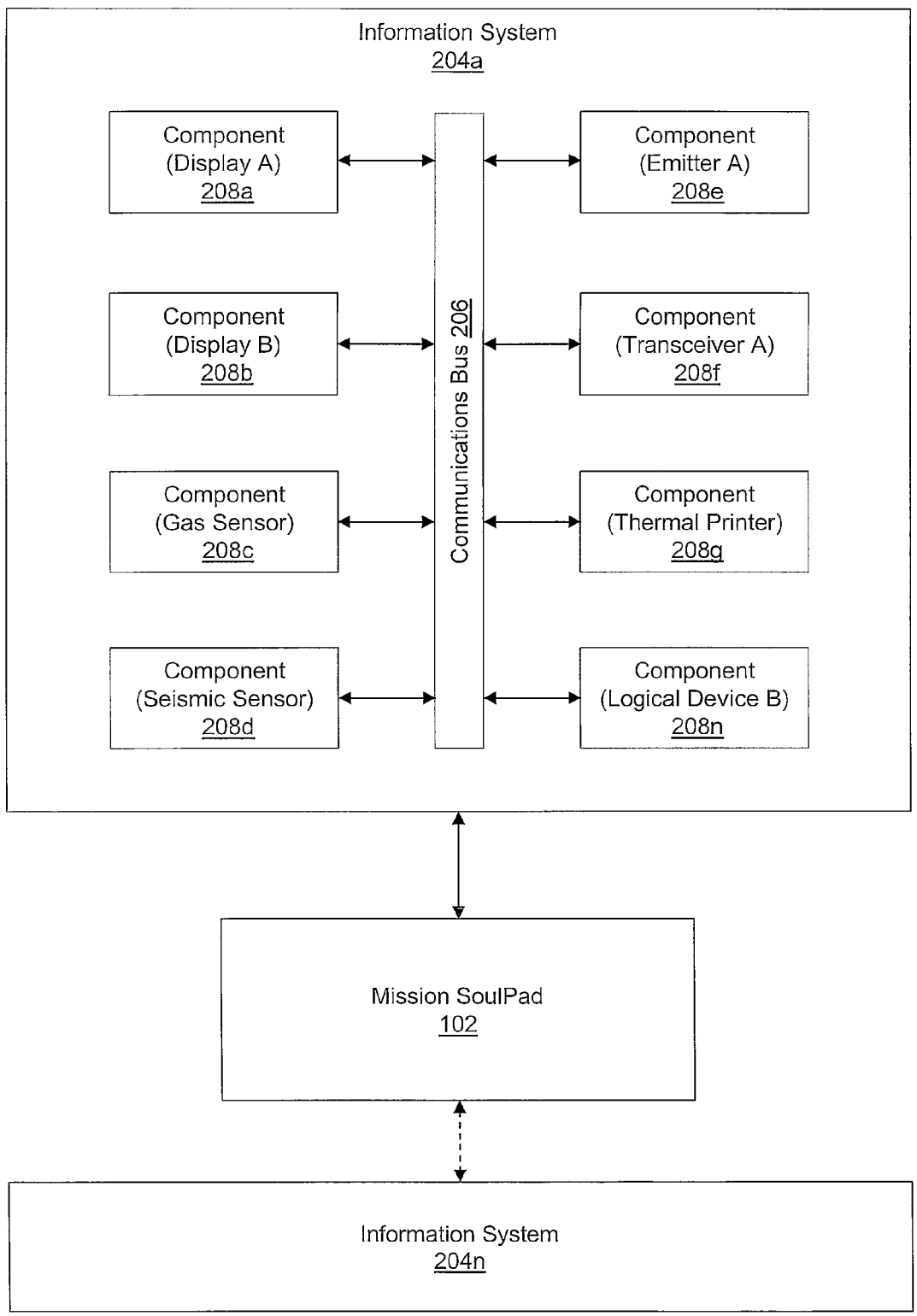
FIG. 2. is a block diagram of an exemplary system for autonomously configuring information systems to support mission objectives.

With reference now to FIG. 2, there is illustrated an exemplary system for autonomously configuring information systems to support mission objectives, in accordance with one embodiment of the invention. The illustrative embodiment is described from the perspective of ARL 122 autonomously configuring components 208a-n, where n is an integer greater than one, of one or more information systems 204a-n based on mission objectives (e.g., mission objectives 124, FIG. 1) stored on Mission SoulPad 102.

Information system 204a-n comprises of multiple specialized components connected to a common communication bus 206. Information systems 204a-n may be a personnel information system (e.g., networked heads-up displays, wrist mounted displays, or sensors mounted on a soldier's person) or may alternatively be a vehicle mounted information system (e.g. automobile, train, nautical vessel, airplane, etc). Alternatively, an information system 204a-n may be located at a fixed location (e.g., an Army base, or an office). Components 208a-n perform specialized actions specific to each component 208a-n (e.g., displaying monitored data, tracking a target of interest, chemical threat detection, seismic detection, transmitting/receiving of radio communications, etc). Each component 208a-n is connected to the communication bus 206 of that information system 204a-n. Communication bus 206 serves as a transmission conduit common to components 208a-n of a same information system 204a-n, which serves to allow Mission SoulPad 102 or an internal computer (not pictured) to communicate with components 208a-n of that information system 204a-n. The communication bus 206 also contains means to connect Mission SoulPad 102 (e.g., a USB port, IEEE 1394 port, Ethernet port). When Mission SoulPad 102 is connected to information system 204a-n, ARL 122 identifies components of the connected information system 204 and autonomously re-configures components 208a-n based on mission objectives stored on Mission SoulPad 102. In an alternate embodiment, an operator of Mission SoulPad 102 may also manually enter additional mission objectives via a keyboard (e.g., keyboard 110, FIG. 1).

In an exemplary embodiment, Mission SoulPad 102 is connected to on-board information system 204a on an armored personnel carrier (APC). Mission SoulPad 102 contains stored mission objectives for monitoring hazardous gas levels, and displaying this relevant information on a display. Utilizing this information, ARL 122 autonomously reconfigures an onboard gas sensor, component 208c, to detect the hazardous gas levels, and then reconfigures a secondary display, component 208b, to display the current hazardous gas levels in real-time. Additionally ARL 122 may reconfigure a thermal printer, component 208g, to print relevant data, or may monitor radio transmissions via a transceiver, component 208f, for future instructions.

Additionally, when identifying components 208a-n of an information system 204a-n, ARL 122 may determine if any connected components 208a-n are malfunctioning. A malfunctioning component 208a-n may be any specific component 208a-n that connected to an information system 204a-n that is unable to perform the typical operations. Additionally, ARL 122 may identify a component 208a-n as malfunctioning because the component 208a-n is damaged or missing. Upon detecting a malfunctioning component 208a-n, ARL 122 may transmit a notification message to a functional component 208a-n of the same information system 204a-n to inform an operator of Mission SoulPad 102 of damaged components 208a-n. The notification message may be presented in the form of an audio message (e.g., a voice recording or pre-recorded audio message played back on a speaker), or a text based message (e.g., a pop-up or flashing message on a display)

In the event that ARL 122 identifies a malfunctioning component 208a, ARL 122 may autonomously reconfigure another similar component 208b-n of a currently connected information system 204a to perform the operations normally performed by the malfunctioning component 208a. For example, a primary display, component 208a, of the APC typically displays critical vehicle information of the APC, such as current speed, fuel levels, engine temperature, etc. The secondary display, component 208b, of the APC typically displays a real-time satellite GPS map of the current location of the APC. In the event that the primary onboard display, component 208a, of the APC is damaged, ARL 122 autonomously reconfigures the secondary display to display both the critical vehicle information and the satellite GPS map simultaneously. To accomplish this task ARL 122 may reconfigure the display in a meaningful manner, such as by dividing the display into two virtual displays, or by reformatting the satellite GPS map to fill a smaller, windowed portion of the display and moving the satellite GPS map view to an out-of-the way location of the currently displayed view. Similarly, in the event that a specific sensor is damaged, ARL 122 may autonomously reconfigure another similar sensor to perform a specific task, or may have the similar sensor perform multiple tasks simultaneously, or in an alternating fashion.

ARL 122 may autonomously detect the presence of newly installed components 208a-n, or replacement components 208a-n (intended to replace malfunctioning components). In response to identifying the presence of a newly installed component 208a-n, ARL 122 may autonomously reconfigure the newly installed component 208a-n to perform a specific task. Alternatively, ARL 122 may autonomously reconfigure the newly installed component 208a-n to enable new functionality of information system 204a-n, or to restore original functionality to one or more components 208*a-n* of information system 204*a-n* in response to the newly installed component 208*a-n* replacing a malfunctioning component 208*a-n*.

Mission SoulPad 102 autonomously monitors mission objectives and current conditions of a connected information system 204*a-n* in real-time. When Mission SoulPad 102 determines that the connection to an information system 204*a* has been severed, ARL 122 may autonomously create a last configuration profile (not pictured). The last configuration profile is the configuration of the disconnected information system 204*a* just prior to disconnection. Upon connecting Mission SoulPad 102 to another information system 204*b-n*, ARL 122 may autonomously restore the last configuration profile on the newly connected information system 204*b*. Alternatively, ARL 122 may configure information system 204*b* simply based on current mission objectives.

Figure 3:
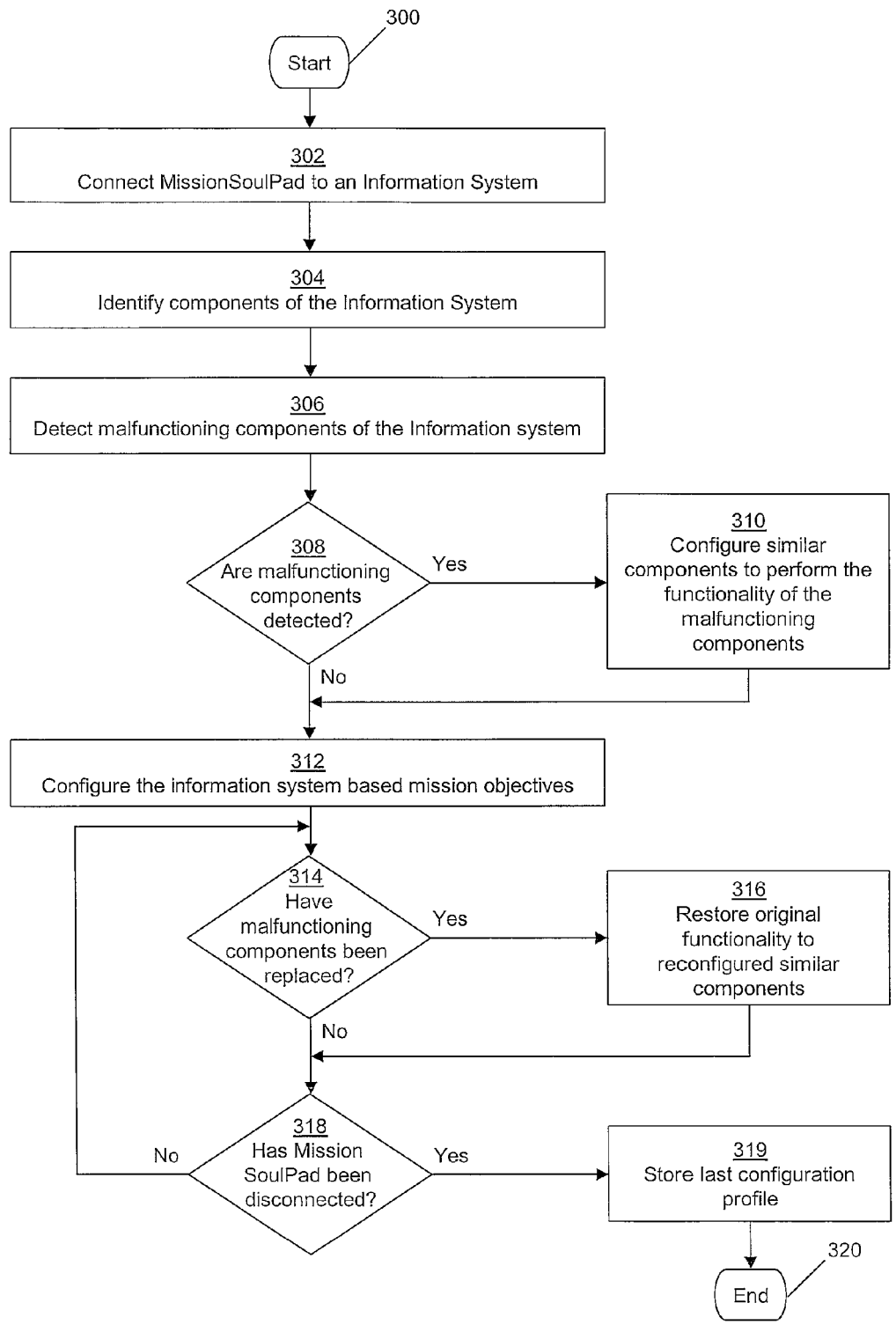
FIG. 3. is a high-level logical flowchart of an exemplary method for autonomously configuring information systems to support mission objectives.

With reference now to FIG. 3, a high-level logical flowchart is provided; illustrating an exemplary method for autonomously configuring information systems to support mission objectives. After initiator block 300, the Mission SoulPad is connected to an information system (block 302). Upon detection of a connection of the Mission SoulPad to the information system, ARL identifies components of the information system (block 304). ARL may then detect malfunctioning components of the information system (block 306). In response to determining that there are malfunctioning components in the connected information system (block 308), ARL may configure one or more components that are similar to a malfunctioning component of the information system to perform the functionality typically performed by the malfunctioning component (block 410).

Next, ARL autonomously configures the information system in accordance with mission objectives stored on the Mission SoulPad (block 312). After configuring the information system ARL continually scans for the presence of additionally connected components to determine if malfunctioning components have been replaced (block 314). When replacement components have been detected, ARL autonomously configures the replacement components and restores the originally intended functionality of the identified similar components (block 316).

Upon detecting that the Mission SoulPad has been disconnected from the information system (block 318), ARL copies and stores the last configuration profile (block 319). The process ends at terminator block 320.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for automatically configuring information systems, the system comprising:
   connecting a device to a first information system;
   dynamically identifying, using the device, a plurality of components of the first information system, wherein the components comprise sensor components and display components; and
   autonomously reconfiguring, using the device, the sensor components and the display components of the first information system based on a plurality of predefined mission objectives stored on the device, wherein the predefined mission objectives define what is to be displayed on the display components and monitoring levels for the sensor components.

2. The method of claim 1, further comprising:
   identifying a malfunctioning component included in the plurality of components; and
   notifying an operator of the device of the malfunctioning component.

3. The method of claim 2, further comprising:
   in response to identifying the malfunctioning component, identifying, using the device, a similar component, included in the plurality of components, that is capable of performing a function normally performed by the malfunctioning component;
   reconfiguring using the device, the similar component to perform the function of the malfunctioning component; and
   automatically rerouting operations of the malfunctioning component, using the device, to the similar component.

4. The method of claim 3, further comprising:
   in response to determining that the malfunctioning component has been replaced with a replacement component, reconfiguring, using the device, the replacement component to perform the function of the malfunctioning component; and restoring, using the device, an original functionality to the similar component.

5. The method of claim 1, further comprising, in response to determining that the connection to the first information system has been severed and that a connection has been established to a second information system:
identifying, using the device, a plurality of components of the second information system; and
autonomously reconfiguring the device, the second information system.

6. The method of claim 5, wherein the second information system is configured based on a last configuration profile of the first information system prior to the connection being severed.

7. The method of claim 5, wherein the second information system is reconfigured based on the plurality of predefined mission objectives.

8. A device comprising:
a memory;
a communications bus interface;
a processor coupled to the memory and the communications bus interface, wherein the processor is configured for:
interfacing the device to a first information system;
dynamically identifying a plurality of components of the first information system, wherein the components comprise sensor components and display, components; and
autonomously reconfiguring the sensor components and the display components of the first information system based on a plurality of predefined mission objectives stored on the device, wherein the predefined mission objectives define what is to be displayed on the display components and monitoring levels for the sensor components.

9. The device of claim 8, wherein the processor is further configured for:
identifying a malfunctioning component included in the plurality of components; and
notifying an operator of the device of the malfunctioning component.

10. The device of claim 9, wherein the processor is further configured for:
in response to identifying the malfunctioning component, identifying a similar component, included in the plurality of components, that is capable of performing a function normally performed by the malfunctioning component;
reconfiguring the similar component to perform the function of the malfunctioning component; and
automatically rerouting operations of the malfunctioning component to the similar component.

11. The device of claim 10, wherein the processor is further configured for:
in response to determining that the malfunctioning component has been replaced with a replacement component, reconfiguring the replacement component to perform the function of the malfunctioning component; and
restoring an original functionality to the similar component.

12. The device of claim 8, wherein the processor is further configured for, in response to determining that the connection to the first information system has been severed and that a connection has been established to a second information system:
identifying a plurality of components of the second information system; and
autonomously reconfiguring the second information system.

13. The device of claim 12, wherein the second information system is configured based on a last configuration profile of the first information system prior to the connection being severed.

14. The device of claim 12, wherein the second information system is reconfigured based on the plurality of predefined mission objectives.

15. A computer-readable medium having a plurality of instructions embodied therein, wherein the plurality of instructions, when executed by a processor, allows a machine to:
connect to a first information system;
dynamically identify a plurality of components of the first information system, wherein the components comprise sensor components and display components; and
autonomously reconfigure the sensor components and the display components of the first information system based on a plurality of predefined mission objectives stored on the machine, wherein the predefined mission objectives define what is to be displayed on the display components and monitoring levels for the sensor components, and wherein the computer-readable medium is a computer-readable storage medium.

16. The computer-readable medium of claim 15, the plurality of instructions further comprising instructions for enabling the machine to:
identify a malfunctioning component included in the plurality of components;
notify an operator of the machine of the malfunctioning component;
in response to identifying the malfunctioning component, identify a similar component included in the plurality of components, that is capable of performing a function normally performed by the malfunctioning component;
reconfigure the similar component to perform the function of the malfunctioning component;
automatically reroute operations of the malfunctioning component to the similar component;
in response to determining that the malfunctioning component has been replaced with a replacement component, reconfigure the replacement component to perform the function of the malfunctioning component; and
restore an original functionality to the similar component.

17. The computer-readable medium of claim 15, the plurality of instructions further comprising instructions for enabling the machine to, in response to determining that the connection to the first information system has been severed and that a connection has been established to a second information system:
identify a plurality of components of the second information system; and
autonomously reconfigure the second information system.

18. The computer-readable medium of claim 17, wherein the second information system is configured based on a last configuration profile of the first information system prior to the connection being severed.

* * * * *